United States Patent [19]

Cherenko et al.

[11] 3,958,245

[45] May 18, 1976

[54] ANTENNA WINDSHIELD

[75] Inventors: Joseph P. Cherenko, Valencia; Hugh E. Shaw, Jr., New Kensington, both of Pa.

[73] Assignee: PPG Industries, Inc., Pittsburgh, Pa.

[22] Filed: Mar. 27, 1974

[21] Appl. No.: 455,469

Related U.S. Application Data

[63] Continuation-in-part of Ser. No. 400,765, Sept. 26, 1973, abandoned.

[52] U.S. Cl. ................................. 343/713; 156/99; 428/421
[51] Int. Cl.² .......................................... H01Q 1/32
[58] Field of Search ........... 343/711, 712, 713, 873; 156/99; 428/421

[56] References Cited
UNITED STATES PATENTS

| | | | |
|---|---|---|---|
| 3,810,180 | 5/1974 | Kunert et al. | 343/713 |
| 3,845,489 | 10/1974 | Sauer et al. | 343/713 |

*Primary Examiner*—Eli Lieberman
*Attorney, Agent, or Firm*—Edward I. Mates

[57] ABSTRACT

A laminated bilayer antenna windshield having an outer glass sheet laminated to an inner sheet of polyvinyl butyral carring an elongated conductive element, such as a wire, in close relation to the interfacial surface with the outer glass sheet. The bilayer antenna windshield has a higher Q-value than similar bilayer laminated antenna windshields provided with a layer of polyvinyl butyral carrying the elongated electroconductive element in spaced relation to said interfacial surface or than the Q-value of conventional trilayer windshields having two glass sheets laminated to opposite sides of a layer of polyvinyl butyral carrying the elongated electroconductive element.

7 Claims, 3 Drawing Figures

ANTENNA WINDSHIELD

REFERENCE TO OTHER APPLICATIONS

This application is a continuation-in-part of application Ser. No. 400,765 of Joseph P. Cherenko and Hugh E. Shaw, Jr. for ANTENNA WINDSHIELD, filed Sept. 26, 1973, now abandoned.

BACKGROUND OF THE INVENTION

This invention relates to antenna windshields and particularly to those comprising a single, outer glass sheet laminated to a layer of flexible plastic such as polyvinyl butyral that has an elongated electroconductive element embedded therein. The electroconductive element is preferably a wire covered by a moisture-impervious, non-electroconductive sheath. The wire is adapted to be coupled to a radio in a vehicle in which the windshield is installed so that the wire serves as an antenna for the radio.

Laminated antenna windshields comprising a pair of matched glass sheets laminated to opposite sides of an interlayer of polyvinyl butyral in which one or more electroconductive wires are embedded in the interlayer have served as antennas for radios installed in automobiles. Using the laminated windshield to support the antenna has improved the styling of automobiles by eliminating the whip antenna that extended from the vehicle body. Its use has also avoided a source of vandalism—the snapping of the antenna from the automobile.

Several patents have been issued on laminated antenna windshields. These include U.S. Pat. Nos. 3,208,070 to Boicey, 3,484,583 and 3,484,584 to Shaw, 3,543,272 and 3,638,225 to Zawodniak, 3,549,785 to Timko, 3,576,576 to Jensen, 3,579,243 to Dickason, 3,599,214 to Altmayer, 3,615,986 and 3,618,102 to Dickason and Richardson, 3,680,132 to Tolliver, and 3,728,732 to Igarashi. All of the aforesaid patents illustrate laminated antenna windshields having antenna wires embedded in an interlayer of polyvinyl butyral which is sandwiched between a pair of glass sheets.

None of the patents in the laminated antenna windshield art either suggested or made obvious a laminated antenna windshield of the so-called bilayer type where one layer is composed of a sheet of glass and the other layer is composed of plasticized polyvinyl butyral into which an elongated antenna element is embedded.

A suitable measurement of the performance of an antenna windshield is its so-called Q-value. The Q-value is an important characteristic of any tuned circuit and is defined as the ratio between the amount of energy stored in the circuit and the amount of energy lost. A standard test has been devised using a Q-meter tuned to a frequency of 1 megahertz. The Q-meter is connected in place of the automobile radio to a so-called pig tail wire electrically connected to the antenna wire of the antenna windshield. A commercially available Q-meter suitable for use in this standard test is manufactured by Hewlett Packard and sold under the Boonton Radio trademark as type 260-A.

Each antenna windshield tested is mounted in the frame of an automobile so that the windshield occupies the same position it would normally occupy when permanently installed in the automobile. The Q-meter test has been used to evaluate many changes proposed in the past for antenna windshield configurations. As will be disclosed later in this specification, the teaching of the present invention has resulted in antenna windshields having higher Q-values and better radio reception than conventional laminated antenna windshields composed of two glass sheets and an interlayer of polyvinyl butyral in which the antenna wire is embedded in the interlayer.

SUMMARY OF THE INVENTION

The present invention provides laminated antenna windshields having higher Q-values than present commercial antenna windshields comprising two sheets of glass and an interlayer of polyvinyl butyral by eliminating the inner sheet of glass from the laminated windshield. The resulting bilayer windshield has been found to provide safety glass with superior impact-resistant properties over a wide range of temperatures than the more conventional trilayer windshields. Furthermore, when properly assembled according to the present invention, bilayers comprising a single outer sheet of glass and an inner layer of polyvinyl butyral in which the polyvinyl butyral layer carries an antenna wire, have Q-values that are surprisingly high, particularly when the antenna wire is encased in a water-impervious, non-electroconductive sheath, such as enamel, and is embedded within the polyvinyl butyral layer in close juxtaposition to the glass sheet and closer to the interfacial surface between the polyvinyl butyral layer and the glass sheet than to the opposite polyvinyl butyral surface. The term "bilayer" as used herein excludes a second sheet of glass, but may include or exclude a thin protective film of a plastic composition that is adherent to polyvinyl butyral and has better resistance to moisture penetration than polyvinyl butyral. The thin film is bonded to the polyvinyl butyral surface spaced from glass. The polyvinyl butyral layer may be composed of one or more sheets of polyvinyl butyral that constitute a layer.

The present invention will be understood more clearly in the light of a description of particular embodiments, which follow.

BRIEF DESCRIPTION OF THE DRAWINGS

In the drawings forming part of the description of illustrative embodiments, wherein like reference numbers refer to like structural elements.

DESCRIPTION OF THE PREFERRED EMBODIMENT

Figure 1:
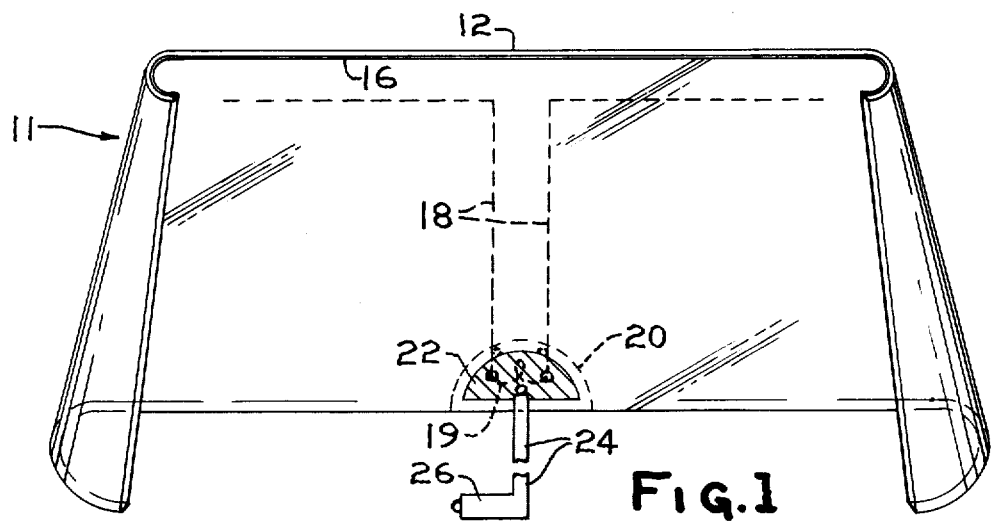
FIG. 1 is a perspective view of an antenna windshield conforming to the present invention looking at the windshield from within a vehicle.
Figure 2:
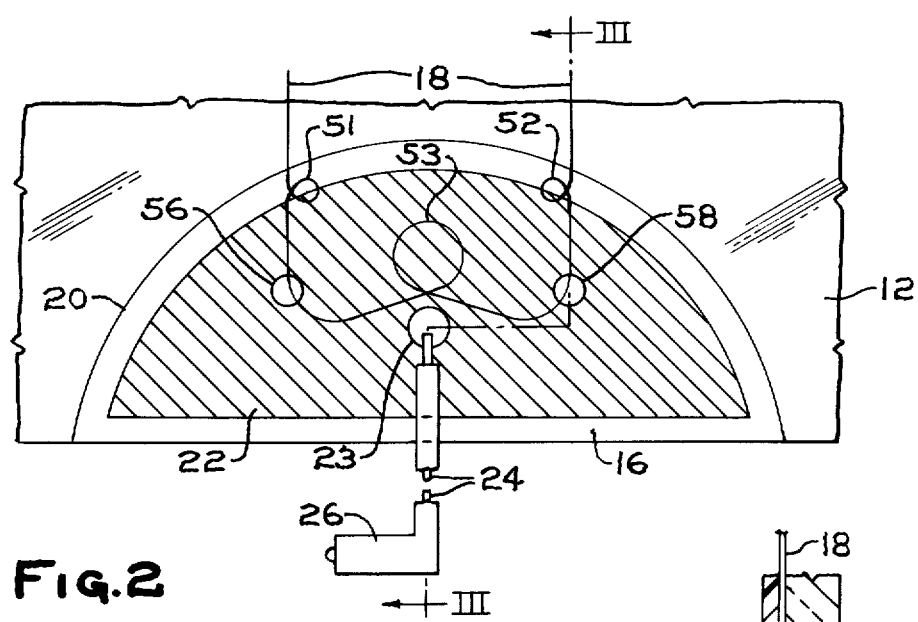
FIG. 2 is an enlarged view of a critical portion of said windshield depicted in FIG. 1 looking at the windshield portion from outside the vehicle.

Referring to the drawings, reference number 11 refers to a laminated windshield comprising an outer glass sheet 12 to which is bonded an innerlayer 16 of thermoplastic material, preferably a preformed sheet of plasticized polyvinyl butyral of the type to be described later in detail. A thin protective film of polyvinyl fluoride and the like (not shown) may be bonded to the layer of polyvinyl butyral at its surface opposite the surface bonded to the glass sheet 12. In the usual automobile windshield, the outer glass sheet 12 is curved and has an outline conforming to the windshield frame in which the laminated windshield is installed. The outer glass sheet 12 has a surface facing away from the interlayer that is convexly curved while its inner surface facing the interlayer 16 is concavely curved.

Present day commercial windshields comprise two glass sheets of equal thickness 0.09 to 0.12 inch thick disposed on opposite sides of a polyvinyl butyral interlayer 0.03 inch thick. Either glass sheet may be composed of annealed plate, float or sheet glass. The laminated antenna windshield according to the present invention eliminates the inner glass sheet. The outer glass sheet has a thickness of 0.05 to 0.25 inch while the innerlayer of polyvinyl butyral has a thickness of 0.005 to 0.06 inch and may be coated with a thin protective film 0.0005 to 0.005 inch thick. An elongated wire 18, having a thickness of 0.0001 inch to 0.050 inch, but less than that of said interlayer, and comprising a pair of transverse elements extending across the width of the center of the windshield and longitudinally extending portions extending away from the transverse elements and each other, is embedded within the interlayer 16 except for a central portion 19 which extends outside of the interlayer sheet and is supported within a notched portion 20 along a longitudinal lower side edge of the outer glass sheet 12. If desired, the outer glass sheet may be strengthened by chemical tempering as in U.S. Pat. No. 3,396,075 to Morris.

The wire 18 is preferably a 36 gauge copper wire encased in a water-impervious, non-electroconductive, enamel sheath and has a maximum diameter of 0.005 inch so as to be virtually invisible to an occupant. It is arranged in the laminated windshield in symmetrical arrangement relative to an axis extending transversely across the mid-point of the windshield. The wire can be arranged in any well known manner, but in the illustrative embodiments, comprises the usual dipole arrangement with two L-shaped elements disposed in a mirror relation as depicted in the drawings.

A metal tab 22, preferably a thin shim of copper about 10 mils thick connected at 23 to a lead-in wire 24 which terminates in a plug 26, is inserted within the notched portion of the outer glass sheet 12 and adheres to the interlayer 16. The lead-in wire 24 is insulated except for its extremity portion that is connected to the metal tab 22 to which it is securely welded or soldered or otherwise securely fastened sufficiently strongly to withstand a pull of more than 10 pounds without failure. The central portion 19 of antenna wire 18 is attached to the metal tab 22 in a manner to be described in greater detail hereafter.

Figure 3:
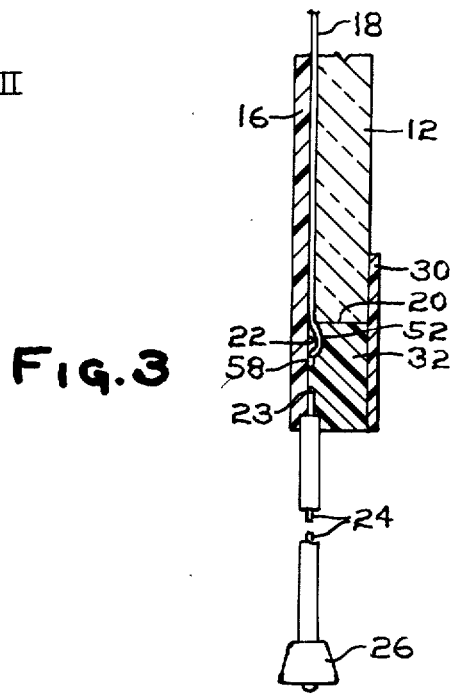
FIG. 3 is an enlarged sectional view taken along the lines III—III of FIG. 2.

The interlayer sheet 16 has the wire 18 embedded therein by using the apparatus depicted in FIGS. 3 and 4 of U.S. Pat. No. 3,543,272 of Zawodniak. The disclosure of the aforesaid wire embedding apparatus taken from the latter patent is incorporated by reference in the present specification.

The plastic interlayer material 16 is selected from those materials which are flexible, optically transparent and are somewhat abrasion resistant. Further, the plastic interlayer materials, when laminated to glass to form the windshield of this invention, should minimize the dangers of both lacerative and concussive injuries. To fulfill these latter two requirements, the plastic interlayer material should be flexible, should have a good tensile strength and should adhere well to glass at ambient conditions. The plastic interlayer should be flexible such that when the windshield is impacted by a passenger's head cracking the glass, the plastic interlayer can stretch and act as a diaphragm, thereby absorbing impacting energy and minimizing the concussive injury. The plastic interlayer should have good tensile strength to minimize tearing, thereby providing resistance to penetration of the closure.

Accordingly, the plastic sheeting material should have abrasion resistance as measured by A.N.S.I. Code Z 26.1 Test No. 18 for plastics, of no more than 15 percent increase in haze after 100 Taber cycles on a Taber abraser. For flexibility, the plastic interlayer should have a relatively constant Gehman modulus between about −20° and 50°C. of $10^7$ and $10^{9.5}$ log of 3 times the shear modulus in dynes per square centimeter, as measured according to A.S.T.M. D-1053-65. The plastic interlayer should have a tensile strength of at least 1000 pounds per square inch, preferably 2000 to 5000 pounds per square inch, as measured by A.S.T.M. D-636-64T. For adherence, the plastic interlayer material should laminate to the strengthened glass sheet with a bond strength of 2 to 20, preferably 4 to 8, pounds per lineal inch, as measured by the 90° Peel Test according to a slightly modified A.S.T.M. D-1876-61T procedure. The modification to the A.S.T.M. procedure consists of imposing a stainless steel wire screen in the exposed surface of the plastic. The purpose of the screen is to prevent the plastic interlayer from stretching as it is peeled from the surface.

Besides the plastic interlayer material having the above physical properties, the laminated vehicle closure of glass and a flexible plastic ply should have certain physical properties in the combined laminated configuration. Minimum standards for motor vehicle glazing are determined in accordance with the procedures described in the A.N.S.I. Code Z 26.1 tests. Therefore, the laminated structures contemplated by this invention have the following physical properties when tested according to the procedure set forth in the A.N.S.I. Code Z 26.1 test.

Properties of Laminated Windshield
Prepared as Contemplated by the Invention

| A.N.S.I. Code Z 26.1 Test Number | Property Measured | Result |
|---|---|---|
| 1 | Light Stability | Samples are unaffected[1] by 117 hours exposure to ultraviolet light |
| 2 | Luminous Transmittance | 82% to 90% |
| 9 | Impact Strength (Dart) | No penetration |
| 12 | Impact Strength (ball ½ pound) | No penetration |
| 15 | Optical Deviation and Distortion | Not observable at specified normal angle of incidence |
| 26 | Penetration Resistance[2] | No penetration |

[1]Samples did not visibly yellow nor lose visible transmittance
[2]Test slightly modified by clamping the bilayer structure to the frame when the plastic side was impacted Plastic interlayer compositions which have been found to possess the above characteristics are polyvinyl acetal resins, such as plasticized polyvinyl butyral coated with a thin film of protective material such as polyvinyl fluoride. Plasticized polyvinyl acetal resins have the required transparency, tensile strength and flexibility needed for laminated windshields. Polyvinyl butyral is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and it elongates greatly without tearing whenever an object impacts upon a laminated safety glass window such as the bilayer safety glass windshield described herein.

The polyvinyl acetal resins may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be used. In general, the acetal resin is made by reacting an aldehyde with hydrolyzed polyvinyl ester in the presence of a solvent with a product and precipitating the resin product with water. Alternate methods might include carrying out the reaction in the presence of a non-solvent dispersing medium such as water or a non-solvent mixture of water and solvent, for example, a waterethanol mixture. In general, polyvinyl acetal resins made from saturated or unsubstituted aliphatic aldehydes are the most suitable. These would include polyvinyl acetal resins made from unsubstituted saturated aliphatic aldehydes containing less than six carbon atoms and especially those made from formaldehyde, acetaldehyde, butyraldehyde, and mixtures thereof. Particularly preferred are polyvinyl acetal resins made from butyraldehyde, the so-called polyvinyl butyral, the preferred molecular weight ranging from 150,000 to 250,000. The polyvinyl acetal resins may be considered to be made up on a weight basis of from 5 to 25 percent hydroxyl groups, calculated as polyvinyl alcohol, 0 to 40 percent acetate groups, calculated as polyvinyl acetate and the balance being essentially acetal. When the acetal is butyraldehyde acetal, the polyvinyl acetal resin will preferably contain on a weight basis, from 16 to 25 percent hydroxyl groups calculated as polyvinyl alcohol and from 0 to 10 percent acetate groups calculated as polyvinyl acetate, the balance being essentially butyraldehyde acetal. Polyvinyl acetal resins, particularly polyvinyl butyral, are well known in the art as efficient innerlayers for laminated safety glass windshields. Therefore, further description of the polyvinyl acetal resins is not necessary, as those skilled in the art are well aware of these materials and their methods of preparation. More details on the preparation of polyvinyl acetal resins are found in U.S. Pat. Nos. Re. 20,430 and 2,496,480.

Conventionally, polyvinyl acetals, particularly polyvinyl butyral as used in safety-glass laminates, contains a plasticizer. Generally, the plasticizer used is a water-insoluble ester of a polybasic acid and a polyhydric alcohol. Particularly desirable plasticizers for use in the present invention are triethylene glycol di(2-ethyl butyrate), dibutyl sebacate, di(beta-butoxy-ethyl) sebacate and dioctyl phthalate.

Various plasticized polyvinyl acetal resins are described in detail in U.S. Pat. No. 2,372,522.

Many well-known plasticizers suitable for use with polyvinyl butyral are disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid or a polyhydric alcohol. Particularly desirable plasticizers for use in the present invention are triethylene glycol di(2-ethylbutyrate), dibutyl sebacate, di(beta-butoxy-ethyl) adiptate, and dioctyl phthalate. Other suitable plasticizers include triethylene glycol fully esterified with a mixture of 80–90 percent caprylic acid and 10–20 percent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl paratoluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known.

It should be mentioned that although the polyvinyl acetal resins can be used in the practice of this invention certain precautions should be taken when using these innerlayer materials. The materials are particularly susceptible to moisture and if care is not taken, the moisture will permeate the polyvinyl acetal innerlayer and weaken the bond between the innerlayer and the outer glass ply. To prevent this, a thin, protective, moisture-resistant coating is bonded to the exposed surface of the polyvinyl acetal sheet. Such a protective coating would be, for example, a sheet of cellulose acetate-butyrate disclosed in French Patent Specification 2,123,089 or unplasticized polyvinyl acetal as in U.S. Pat. No. 2,184,876 to J. H. Sherts, which could be applied by conventional spraying or brushing techniques.

Also, the exposed surface of the polyvinyl-acetal innerlayer could be protected by vapor depositing a surface layer of $SiO_2$ thereon. Such a technique is described in British Patent No. 1,144,099.

Further, the exposed surface of the polyvinyl acetal innerlayer could be protectively coated with a thin polyurethane layer.

A most suitable protective layer is polyvinyl fluoride, which is available under the trademark of TEDLAR in thickness of 0.0005 inch to 0.005 inch. Other suitable protective materials include polyvinylidene chloride, polyvinylidene fluoride, polyisobutylene, polyvinyl chloride, a copolymer of vinylidene chloride and vinyl chloride, a polyolefin such as polypropylene, polyamides (e.g. nylon), polyesters (e.g. MYLAR), ethylenic ionomers (e.g. SURLYN) and polyallomars (block copolymers of ethylene and propylene).

Any well known commercial plate, float or sheet glass composition or any other transparent glass generally used in windows is suitable for use as the outer glass sheet of a bilayer windshield. Particularly suitable compositions are those of the soda-lime-silica type which may include or exclude a glass tinting composition such as about one-half percent of iron oxide.

Preferable, the present invention relates to the formation of bilayer windshields whose outer ply is a commercial soda-lime-silica glass such as glasses having the following composition:

|  | Percent by Weight |
|---|---|
| $Na_2O$ | 10-15 |
| $K_2O$ | 0-5 |
| CaO | 5-15 |
| $SiO_2$ | 65-75 |
| MgO | 0-10 |
| $B_2O_3$ | 0-5 |

A typical soda-lime-silica glass suitable for use in accordance with this invention has the following composition:

|  | Percent by Weight |
|---|---|
| SiO | 71.38 (usual variation 71 to 74%) |
| $Na_2O$ | 12.76 (usual variation 12 to 14%) |
| $K_2O$ | 0.03 (usual variation 0 to 1%) |
| CaO | 9.67 (usual variation 8 to 12%) |
| MgO | 4.33 (usual variation 2 to 5%) |
| $Na_2SO$ | 0.75 (usual variation 0.1 to 1.0%) |
| $Fe_2O_3$ | 0.15 (usual variation 0.1 to 1.0%) |
| $Al_2O_3$ | 0.81 (usual variation 0.1 to 1.0%) |

A similar glass sheet may be used as a mold during lamination of the bilayer windshield and held in pressurized engagement against an exposed surface of the polyvinyl butyral sheet with a parting material therebetween. Preferably, the parting material is one that serves as a protective film for the polyvinyl butyral after the antenna bilayer windshield is laminated and removed from the second glass sheet that serves as a laminating mold.

If desired, the laminating mold may be composed of glass that is chemically tempered by ion exchange at an elevated temperature below the strain point as taught in U.S. Pat. No. 3,477,834 to John W. Morris. A typical chemical tempering operation involves immersing the mold in a potassium nitrate bath for 6 hours at 900°F. This treatment strengthens the glass mold without distorting its shape and enables the mold to be reused in the fabrication of many bilayer windshields.

The glass mold may have its margin grooved to permit the insertion of a tool to help separate the laminated bilayer windshield from the mold. However, this grooving is not necessary when the parting material is selectively adherent to polyvinyl butyral under pressure and temperature conditions of an autoclave cycle used commercially to laminate trilayer glass-polyvinyl butyral-glass windshield and non-adherent to glass under these conditions of lamination as is the case with polyvinyl fluoride and other materials enumerated elsewhere.

The wire laying apparatus disclosed in U.S. Pat. No. 3,543,272 of Zawodniak is used to embed the wire 18 into the preformed sheets 16 of polyvinyl butyral according to the pattern desired for the antenna windshield. The sheets of polyvinyl butyral are stored with the embedded wire in a room of controlled temperature and humidity until needed for lamination. A typical storage room for these sheets is kept at approximately 70°F. and a maximum relative humidity of 20%.

In forming the laminated antenna windshield of the present invention, a pair of glass sheets of matching outline and each having a nominal thickness of ⅛ inch is mounted on a bending mold of outline configuration and concave elevation, such as depicted in U.S. Pat. No. 3,248,196 to McKelvey, and the glass is heated sufficiently to sag onto the shaping surface. A suitable parting material, such as a suspension of finely divided diatomaceous earth in water as suggested in U.S. Pat. No. 2,725,320 to Atkeson and Golightly, is applied to the interfacial surface between the two sheets to prevent the sheets from fusing together during the bending operation. The two glass sheets are stacked one over the other after the lower sheet of the stack has had a notch cut out along one of its longitudinal edges. After the sheets are bent, they are cooled at a controlled rate while still supported on the bending mold and then removed from the mold when cool enough to handle.

The stored sheets of polyvinyl butyral containing the embedded wire are ready for lamination to the notched bent glass sheet of the pair. The best pair of matching glass sheets are separated from one another. The unnotched glass sheet 14 is mounted with its concave surface downward over a support of convex elevation. A thin sheet of polyvinyl fluoride ½ mil to 2 mils thick is applied over the upper convex surface of the unnotched glass sheet. A sheet of plasticized polyvinyl butyral having a nominal thickness of 30 mils is then applied over the glass sheet that is not notched and the notched glass sheet 12 aligned over the polyvinyl butyral sheet 16 with its notched portion 20 aligned with the loop 19 of exposed wire extending from the polyvinyl butyral sheet 16. The polyvinyl butyral sheet is trimmed to have its outline conform to that of unnotched glass sheet 14 with the loop 19 of exposed wire 18 carefully held to prevent its being cut during the plastic trimming operation.

The glass-plastic assembly so formed is temporarily held together by applying tape at spaced portions of the margin. The taped assembly is prepressed and laminated. A preferred prepressing apparatus used is described and claimed in U.S. Pat. No. 3,351,001 to Anthony A. Achkio, assigned to PPG Industries, Inc. and comprises a pair of nipper rolls which force out fluid from the interfaces between the sheets comprising the taped assembly.

After prepressing and before final lamination, a thin metal tab 22 of a highly conductive metal such as copper having a lead-in wire 24 and a plug 26 for a radio receiver attached thereto is pressed against the portion of the interlayer sheet 16 that faces the notched portion 20 of notched sheet 12. The central portion 19 of the wire is then folded to form a pair of relaxed portions 51 and 52 and additionally twisted to form loop 53 intermediate the two relaxed portions 51 and 52 so that the entire central portion 19 of the wire 18 fits within the notched portion 20 of the sheet 12 that lies over the interlayer sheet 16. The wire 18 is then electrically connected to the metal tab 22 at a solder or welding connection 56 which is intermediate relaxed portion 51 and loop 53 and at another solder or welding connection 58 which is intermediate relaxed portion 52 and loop 53.

The prepressed assemblies are then laminated in autoclaves at a temperature of about 275° to 300° Fahrenheit and a pressure of about 200 pounds per square inch for about 45 minutes. After the assemblies are removed from the autoclave, the glass molds are separated from the remainder of the assemblies to leave bilayer antenna windshields separated from the glass molds.

As an alternative, the laminating operation may be a modification of that disclosed in U.S. Pat. No. 2,948,645 to Keim, where each assembly of glass sheets and a plastic interlayer so treated is prepressed by removing fluid from the interfaces between the sheets comprising the assembly by evacuation through a flexible channel-shaped ring that encompass the assembly and then the assembly is treated to seal the exposed portion of the antenna wire within the notch before the assembly is finally laminated at the elevated temperature and pressure recited above with the ring removed. The assembly prepressed according to the present invention contains a parting material such as a thin sheet of polyvinyl fluoride between the layer of polyvinyl butyral and one of the glass sheets. After final lamination, the glass sheet is removed from the remainder of the assembly which is removed from the autoclave as a laminated assembly. The modification of the lamination operation disclosed in the Keim patent comprises the step of including a layer of parting material such as polyvinyl fluoride in the assembly to be prepressed and laminated and the step of sealing the exposed portion of the antenna wire within the notched portion, which steps are not disclosed in the aforesaid Keim patent.

The prepressed assembly is mounted on a rack with the notched portion 20 facing upward. A transparent adhesive tape such as polyester (MYLAR) tape is applied to the outer surface of the notched glass sheet to form a transparent outer wall 30 for the chamber formed by the notched portion 20 in the sheet 12. The central portion 19 of the antenna wire 18 is handled carefully to insure that it is located entirely within said latter chamber. A suitable fast setting electrical insulating material 32, such as a fast setting polysulfide resin sold under the tradename "Thiokol" by the Thiokol Chemical Company of Bristol, Pa., or a room temperature vulcanizable silicone such as 615 RTV silicone supplied by the General Electric Company, Schenectady, New York, or Scotchcast 225 electrical resin sold by the Minnesota Mining and Manufacturing Company, St. Paul, Minnesota, is injection molded into the notched portion 20.

The transparent polyester tape wall 30 supports the injection molded material in the notched portion 20. The electric circuit so formed is then tested. The plug 26 is inserted in a testing circuit for this test. This indicates whether a signal from the embedded wire will reach a radio circuit in sufficient strength to provide adequate reception. The assembly is then stored with other assemblies for sufficient time for the injection molded material to harden. Then the assembly is ready for final lamination.

Final lamination is conducted at a temperature range of 275° to 300°F. and a pressure of about 200 pounds per square inch for about 45 minutes. After the heat and pressure is reduced, the polyvinyl butyral is laminated between the polyvinyl fluoride and one of the glass sheets, while the other glass sheet is separable from the polyvinyl fluoride.

In an alternate method of making bilayer antenna windshields, two glass sheets one of which has been notched in its central region along one side, are assembled with the notched glass sheet facing one surface of the polyvinyl butyral layer and a parting material, such as a thin sheet of polyvinyl fluoride and the like, interposed between the convex surface of the other glass sheet and the other surface of the polyvinyl butyral layer. The assembly is held in alignment by strips of tape and the taped assembly is wrapped in polyvinyl fluoride plastic. The plastic-wrapped assembly inserted with a so-called "polymar" bag of the type disclosed in U.S. Pat. No. 3,311,517 to Keslar and Rankin. The bag comprises an outer ply of polyethylene glycol terephthalate and an inner ply of polyethylene bonded thereto. The bag is evacuated, sealed and inserted within a second similar bag which is also evacuated and sealed.

The sealed unit is placed in an oil autoclave and subjected to a pressure of 200 pounds per square inch at 275°F. to 300°F. for 45 minutes. The unit is then cooled to room temperature while maintaining the elevated pressure. Then, the pressure is reduced, the unit removed from the autoclave and the bags opened. The glass sheet coated with the parting material is separable from the remainder of the assembly, which constitutes a bilayer laminated assembly comprising the preformed polyurethane sheet and the notched glass sheet.

The metal tab 22 is applied in the notched portion 20 of glass sheet 12 to the polyvinyl butyral layer 16 and the central portion 19 of the antenna wire 18 twisted and soldered to the metal tab 22 in such a manner that the entire central portion 19 is spaced inward of the outer margin of the notched portion. The lead-in wire 24 and the plug 26 are connected to the tab 22. A wall of transparent tape is applied to connect the notched portion into a chamber. The chamber is filled with a fast-setting insulating material and, after the latter sets, the glass sheet coated with the parting material is separated from the rest of the assembly. The bilayer antenna windshield so produced is ready for testing using a Q-meter after its installation in position in the windshield frame of an automobile.

Antenna windshields containing an innerlayer of preformed polyvinyl butyral approximately 0.030 inch thick with embedded antenna wires laminated to a glass sheet of nominal thickness of ⅛ inch were fabricated using polyvinyl butyral sheets with 0.005 inch diameter antenna wire embedded therein, all normally used to produce trilayer antenna windshields for General Motors cars having the so-called B-body used in certain Chevrolet, Oldsmobile and Buick models. The windshields were mounted in place on the windshield frame for each test and were tested for Q-value using a Type 260-A Boonton Radio Company Q-meter. The average Q-value for standard windshields identical to the test windshields that were tested under the same conditions, except for the incorporation of two glass sheets sandwiching therebetween a polyvinyl butyral interlayer in the standard windshields was 99.

The tests reported in Table I tended to establish that so-called bilayer windshields containing a single outer glass sheet and a single innerlayer of polyvinyl butyral carrying an antenna wire adjacent the glass had a significantly higher Q-value than conventional windshields having polyvinyl butyral interlayers between two glass sheets, while bilayer windshields whose innerlayer of polyvinyl butyral carried the antenna wire in spaced relation to the outer glass sheet had a significantly lower Q-value than the conventional trilayer antenna windshields. Additional tests on laminates simulating bilayer antenna windshields reported in Table II tend to indicate that the Q-value of a bilayer antenna laminate is not affected to an appreciable extent by the presence or absence of a thin protective film for the polyvinyl butyral layer, such as a film of polyvinyl fluoride.

EXAMPLE I

Bilayer antenna windshields having their antenna wires embedded in polyvinyl butyral were tested under identical conditions as those used for testing otherwise identical antenna windshields having two glass sheets with antenna wires embedded in a polyvinyl butyral interlayer. This series of experiments was performed using a Type 260-A Boonton Radio Company Q-meter for Q-value measurements.

An automobile (1971 Chevrolet Kingswood 4 door station wagon) was located in a given position for all the following tests reported. A standard antenna windshield comprising two sheets of float glass having a nominal thickness of 3/32 inch per sheet, an interlayer of polyvinyl butyral 0.030 inch thick having a standard metal antenna wire 0.005 inch thick enclosed in enamel embedded in the interlayer was originally installed in the automobile. Five different trilayer antenna windshields were tested in a position they would occupy when installed in the automobile. Each trilayer antenna windshield was placed in position on the vehicle at least three non-consecutive times, the position corresponding to the position occupied by the installed windshield. The Q-value was determined for each trilayer antenna windshield for each time it was placed in position. The average Q-value of these so-called control trilayer windshields was 99. This latter value was the standard control value against which the Q-values of the bilayer windshields tested were compared.

Two sets of bilayer windshields of the size and shape conforming to the windshield opening of the test automobile were prepared. Each set comprised at least three bilayer windshields of the same configuration. The Q-value of each bilayer windshield was measured on three different non-consecutive occasions by placing the windshield in the same position formerly occupied by the control trilayer windshields in the windshield receiving frame of the test automobile, taking the readings needed for a determination of Q-value, removing the bilayer windshield and doing likewise for several other bilayer windshields tested for Q-value before a second or third Q-value determination was made for each bilayer windshield tested. In each case, the bilayer windshields had one glass sheet laminated to a sheet of polyvinyl butyral, whereas the control trilayer windshields had two glass sheets laminated to a sheet of polyurethane or polyvinyl butyral. Each glass sheet in the bilayer windshields tested had a nominal thickness of ⅛ inch and each sheet of polyvinyl butyral had a nominal thickness of 0.030 inch. All the antenna windshield sets had standard copper wire 5 mils thick coated as described previously.

Both test sets of bilayer antenna windshields with standard polyvinyl butyral innerlayers had an outer glass sheet and an inner layer of plasticized polyvinyl butyral. One of these sets had the antenna wire embedded in the polyvinyl butyral layer near the interfacial surface facing the glass. In the other set, the antenna wire was embedded in the polyvinyl butyral layer near the opposite surface thereof.

The results of the various experiments are recorded in Table I.

TABLE I

| EFFECT OF DIFFERENT FACTORS ON Q-VALUE | | |
|---|---|---|
| WINDSHIELD TYPE | ARRANGEMENT | Q-VALUE |
| Standard Trilayer | Glass-polyvinyl butyral (PVB)-glass | 99 |
| Bilayer | Outer glass sheet-antenna in PVB near glass | 111 |
| Bilayer | Outer glass sheet-antenna | 76 |

TABLE I-continued

| EFFECT OF DIFFERENT FACTORS ON Q-VALUE | | |
|---|---|---|
| WINDSHIELD TYPE | ARRANGEMENT | Q-VALUE |
| | in PVB away from glass | |

EXAMPLE II

The following experiments were performed using flat laminates 2 feet by 3 feet of float glass 3/32 inch thick bonded to plasticized polyvinyl butyral 0.030 inch thick into which antenna wire had been embedded in the same pattern of antenna wire as was embedded for the bilayer antenna windshields of Example I. One set of 4 laminates had the free surface of polyvinyl butyral opposite the interfacial surface exposed. Another set of 4 laminates had the free surface of polyvinyl butyral covered with a film of polyvinyl fluoride (sold under the trademark TEDLAR) about ½ mil thick. In these flat laminates, the glass and polyvinyl butyral and the conditions of lamination were as identical as possible to the corresponding parameters of the trilayer and bilayer windshields whose Q-values are reported in Table I. The Q-values of the laminates is reported in Table II.

TABLE II

| Q-VALUES OF BILAYER LAMINATES | | |
|---|---|---|
| CONFIGURATION | Q-VALUE | RANGE OF Q-VALUE WITHIN 90% CONFIDENCE LEVEL |
| Glass-polyvinyl butyral-polyvinyl fluoride | 82 | 90 – 74 |
| Glass-polyvinyl butyral exposed | 78 | 85 – 70 |

From a statistical study of the Q-value measurements reported in Table II, one cannot reject the hypothesis that there is no significant difference between the Q-values of the laminates containing a protective coating of polyvinyl fluoride and those omitting such a protective coating. However, the difference in Q-values reported in Table I are sufficiently large to accept the hypothesis that the Q-values reported in Table I represent a significant difference not explained by variations in experimental data. In other words, the Q-values of glass-polyvinyl butyral bilayer windshields containing antenna wire embedded near the interfacial surface of glass to polyvinyl butyral are significantly more than those of equivalent trilayer antenna windshields containing a second glass sheet, and the Q-values of bilayer windshields of glass and polyvinyl butyral having the antenna wire installed in spaced relation to the interface between the glass and polyvinyl butyral layers are significantly less than the Q-values of similar trilayer antenna windshields having a second layer of glass on the other side of the polyvinyl butyral layer.

From the results of the tests reported in Tables I and II, it has been concluded that when the antenna wire is installed near the interfacial surface between the polyvinyl butyral layer and the single glass layer of a bilayer antenna windshield, the resultant bilayer windshield has a Q-value more than that of an equivalent trilayer antenna windshield having a second sheet of glass. It has also been concluded that the presence or absence of a thin layer of protective film for the polyvinyl butyral layer (such as polyvinyl fluoride) does not affect this improvement in Q-value in a significant amount.

The form of the invention shown and described in this specification is an illustrative embodiment thereof. It is understood that various changes evident to those skilled in the art may be made without departing from the spirit of the present invention as defined by the claimed subject matter that follows.

We claim:

1. A transparent laminated antenna windshield comprising a single sheet of glass, a layer of polyvinyl butyral having elongated wire of electroconductive material embedded in said layer in close juxtaposition to but spaced from one surface thereof, said layer and wire laminated to said glass sheet with said one surface bonded to the interior surface of said sheet of glass, said wire being adapted for coupling to a radio for use as an antenna circuit element when said windshield is installed in a vehicle, the circuit formed on said coupling having a higher Q-value than a similar circuit formed on a windshield similarly installed but also comprising a second sheet of glass laminated to said opposite surface of said layer of polyvinyl butyral.

2. An antenna windshield as in claim 1, wherein said outer glass sheet is curved to have an outward facing surface of convex configuration facing away from said layer of polyvinyl butyral and said opposite surface of said layer of polyvinyl butyral has a concave configuration.

3. An antenna windshield as in claim 2, wherein said outer glass sheet has a thickness of approximately 50 to 250 mils, said layer of polyvinyl butyral has thickness of approximately 5 to 60 mils and said wire has a thickness of approximately 0.1 mil to 5 mils.

4. An antenna windshield as in claim 3, further including a thin layer of a protective film bonded to said opposite surface and taken from the class of materials consisting of polyvinyl fluoride, polyurethane, cellulose acetate-butyrate, unplasticized polyvinyl butyral, polyvinylidene chloride, polyvinylidene fluoride, polyisobutylene, polyvinyl chloride, a copolymer of vinylidene chloride and vinyl chloride, a polyolefin such as polypropylene, a polyamide, a polyester, an ethylenic ionomer and a polyallomar, and ranging from approximately 0.5 mils to 2 mils thick.

5. An antenna windshield as in claim 4, wherein said protective film consists essentially of polyvinyl fluoride.

6. An antenna windshield as in claim 2, further including a thin layer of polyvinyl fluoride bonded to said surface of concave configuration.

7. An antenna windshield as in claim 1, further including a thin layer of polyvinyl fluoride bonded to said opposite surface.

* * * * *